United States Patent
Robinson et al.

(10) Patent No.: US 8,166,002 B2
(45) Date of Patent: Apr. 24, 2012

(54) FLEXIBLE CONFIGURATION ITEM RECONCILIATION BASED ON DATA SOURCE PRIORITIZATION AND PERSISTENT OWNERSHIP TRACKING

(75) Inventors: David G. Robinson, Cary, NC (US); Byron E. Todd, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 12/145,002

(22) Filed: Jun. 24, 2008

(65) Prior Publication Data

US 2009/0319932 A1    Dec. 24, 2009

(51) Int. Cl.
*G06F 17/00* (2006.01)
(52) U.S. Cl. .......................... 707/694; 707/616
(58) Field of Classification Search .................. 707/694, 707/616
See application file for complete search history.

(56) References Cited

U.S. PATENT DOCUMENTS

| | | | | |
|---|---|---|---|---|
| 6,088,706 | A * | 7/2000 | Hild | 707/999.202 |
| 8,037,083 | B2 * | 10/2011 | Meyer et al. | 707/756 |
| 2005/0192981 | A1 | 9/2005 | Nelson | |
| 2006/0136585 | A1 | 6/2006 | Mayfiled et al. | |
| 2007/0094609 | A1 * | 4/2007 | Gilboa et al. | 715/762 |
| 2007/0162519 | A1 * | 7/2007 | Straube et al. | 707/201 |
| 2007/0230443 | A1 * | 10/2007 | Milstein et al. | 370/352 |
| 2008/0120129 | A1 * | 5/2008 | Seubert et al. | 705/1 |
| 2009/0012991 | A1 * | 1/2009 | Johnson et al. | 707/103 R |
| 2009/0070237 | A1 * | 3/2009 | Lew et al. | 705/28 |

OTHER PUBLICATIONS

Coleville, R., J., "CMDB or Configuration Database: Know the Difference", Mar. 2006.
"A Step-by-Step Approach to Using SAS for Univariate & Multivariate Statistics", 2d Edition, Adobe Press, Pearson Education, 2008.
"Stata Learning Module Combining Data", UCLA Academic Technology Services, viewed Jan. 15, 2008.
"Join observations from two or more SAS data sets into single observations", SAS Institute, Inc., 1999.

* cited by examiner

*Primary Examiner* — Rehana Perveen
*Assistant Examiner* — Tiffany Thuy Bui
(74) *Attorney, Agent, or Firm* — Patents on Demand P.A.; Brian K. Buchheit; Scott M. Garrett

(57) ABSTRACT

A reconciliation event can be detected. A controlling element of a database can be determined for the reconciliation event. The controlling element can include a preexisting database value for that element that is different from an update value for that element provided within update data. The update data can be provided by an update data source. A last data source that provided the preexisting database value can be ascertained. A priority array associated with the controlling element can be retrieved from a data store. It can be determined from the priority array whether the update data source has reconciliation priority over the last data source. A value of the controlling element in the database can be changed from the preexisting database value to the update value only when the update data source has reconciliation priority.

15 Claims, 3 Drawing Sheets

FLEXIBLE CONFIGURATION ITEM RECONCILIATION BASED ON DATA SOURCE PRIORITIZATION AND PERSISTENT OWNERSHIP TRACKING

BACKGROUND OF THE INVENTION

The present invention relates to the field of reconciliation of conflicting data base items and, more particularly, to flexible configuration item reconciliation based on data source prioritization and persistent ownership tracking.

Configuration management databases (CMDBs) are extremely useful for allowing information technology (IT) organizations to track, manage, and respond to hardware/software configurations and changes. A common problem facing many CMDBs is the prioritization of attribute data from multiple sources. At the root of the problem is the need to apply detailed control over which data elements should be prioritized from a particular source. One technique currently used is to merely overwrite a data element of a CMDB with a most recent element regardless of source. Another technique is to utilize complex rules and rule sets to compare two different data elements to determine which is a preferred one. Multiple comparisons can be iteratively performed, each of which is generally a comparison of two possible values based upon a rule. This results in computationally expensive processing, which is difficult to implement, understand, and maintain.

Further, real-world situational considerations generally result in extremely complex rule sets, which have a tendency to continuously expand with use. This results in a continuingly escalading complexity, which rapidly becomes outdated and unmanageable. For example, it is not uncommon for some data sources to provide accurate data for a particular set of configuration items, but incorrect or misleading data for other configuration items. For instance, a data source can report a configuration item's hardware configuration accurately, but fail to provide reliable software configuration information. When multiple reconciliation actions (a series of binary comparisons yielding an end result) are performed, each action introduces a possibility of an error, which systems often have a hard time detecting and/or recovering from. That is, a typical corrective measure is to perform a "rollback" database action, which can be overloaded when multiple sequential changes have happened, where an unknown one induced an error. Thus, errors during reconciliation often result in inaccurate or partial data being stored in a database.

Additionally, prioritization rules are often created using programming languages, such as structured query language (SQL), vendor specific languages, specialized business logic, and the like. As such, the rules can be difficult to administer and manage. Generally a complexity of these rules can be beyond an understanding level of a majority of end-users, thus restricting reconciliation configuration to skilled information technology (IT) professionals. As these rules evolve to accommodate more data sources, attributes, and classes, they can quickly grow increasingly complex. Complex rule sets can give rise to unforeseen and unwanted prioritization which can lead to inaccurate or misleading configuration item information being stored. At present, known solutions for these shortcomings have not yet been realized.

BRIEF SUMMARY OF THE INVENTION

One aspect of the present invention can include a method, apparatus, computer program product, and system for reconciliating data. A reconciliation event can be detected. A controlling element of a database can be determined for the reconciliation event. The controlling element can include a preexisting database value for that element that is different from an update value for that element provided within update data. The update data can be provided by an update data source. A last data source that provided the preexisting database value can be ascertained. A priority array associated with the controlling element can be retrieved from a data store. It can be determined from the priority array whether the update data source has reconciliation priority over the last data source. A value of the controlling element in the database can be changed from the preexisting database value to the update value only when the update data source has reconciliation priority.

Another aspect of the present invention can include a system for reconciliation data that includes at least one data store and a reconciliation event handler. The data store can store a structured collection of configuration management data in accordance with a defined data model. Each data element of the structured collection of configuration management data can be indexed against a stored data source that provided its value. The data store can also store a set of user configured priority arrays. Each priority array can order a set of data sources relative to each other. Each priority array can also be associated with a data element. Each data element can be specific to a data element of said defined data model. The reconciliation event handler can detect an attempt to change a preexisting value of an attribute included in the structured collection of data with an update value from an update data source, to determine a controlling element for the change, to determine a priority array based upon the controlling element, and to determine whether to selectively update the preexisting value of the attribute with the update value depending upon whether the update data source has a greater reconciliation priority than the data source associated with the preexisting value based upon the determined priority array.

DETAILED DESCRIPTION OF THE INVENTION

Figure 1:
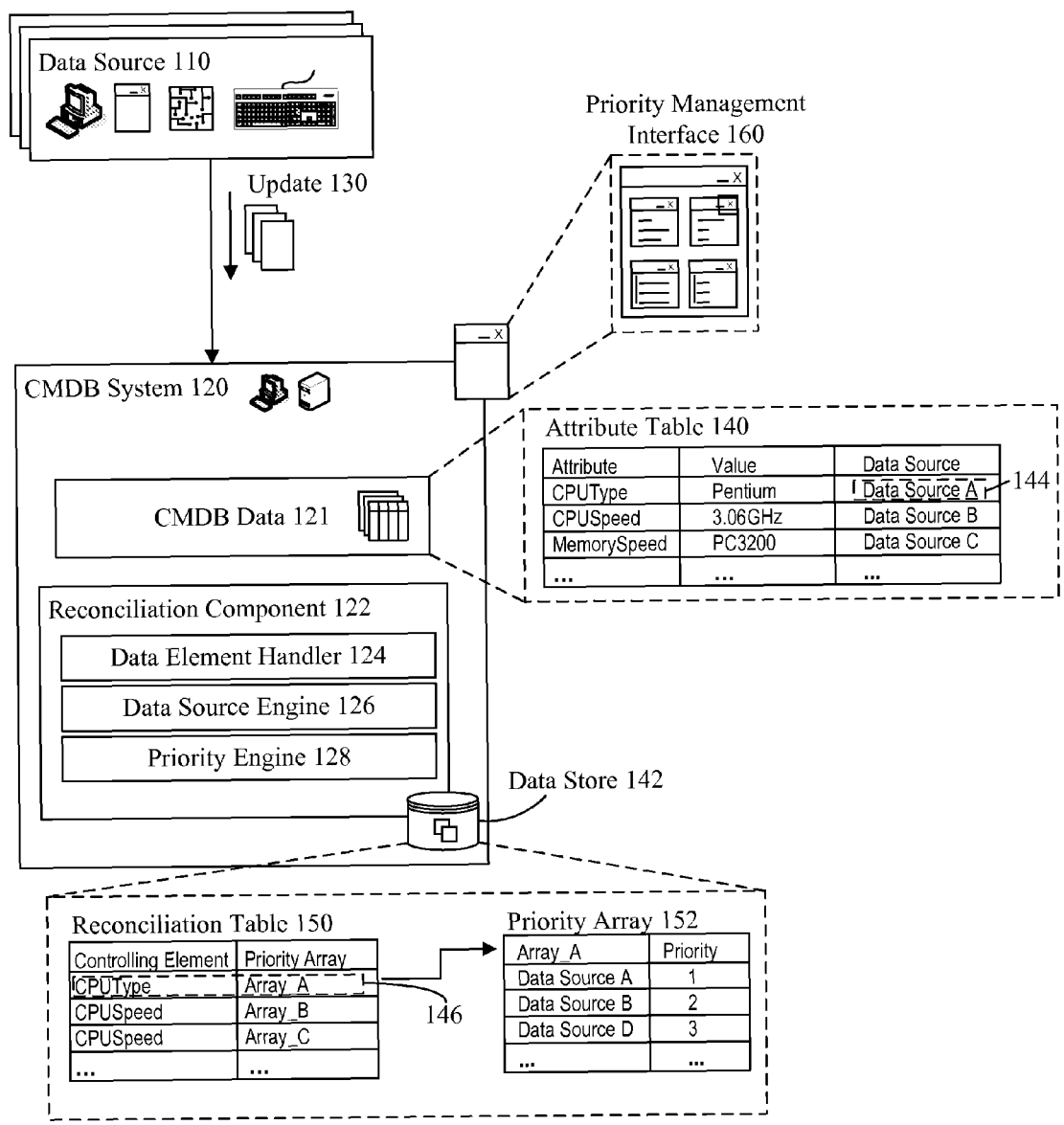
FIG. 1 is a schematic diagram of a system 100 for reconciling data from multiple data sources using a configurable prioritization list in accordance with an embodiment of the inventive arrangements disclosed herein.

The present invention discloses a solution for flexible configuration item reconciliation based on data source prioritization and persistent ownership tracking. Data source prioritization can include an ordered list, whereby a data source at the top position of the list retains highest priority and a data source at the lowest position in the list retains the lowest priority. When item information from a data source is stored, the data source's identity (e.g., name/unique id) is stored as metadata along with the item information. This metadata can be used to identify a data source's priority during reconciliation. If newly received configuration item information has a higher priority than the stored item information, the newly received data can overwrite stored information. Conversely, data sources with lower priority than stored item information can be ignored. Data source prioritization can be performed at the class, subclass, and/or attribute level of a configuration item. Further, data sources can be defined as an abstract representation of any data providing entity.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory), a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 for reconciliating data from multiple data sources 110 using a configurable prioritization list (priority array 152) in accordance with an embodiment of the inventive arrangements disclosed herein. Any number of sources 110 can be included in the prioritization list 152. Each prioritization list 152 can be associated with a data element, definable at a variety of levels. Different ones of the data elements can be associated with different levels of a model inheritance hierarchy.

Data sources 110 can also be flexibly defined. That is, data sources 110 can be abstract representations that can provide data to a database (e.g., configuration management database system 120). Provided data (update 130) can conflict with pre-existing data elements (CMDB data 121) contained within the database 120. When this occurs, the prioritization lists 152 determine whether an original value for a data element contained in a database 120 is to be retained or whether a value contained in an update 130 associated with an updating data source 110 is to replace the current value. This can require that the database 120 stores a data source 110 that provided a data element in a database 121 along with a value for each data element.

In system 100, a user does not need to define a set of rules using a complex rules engine or code-like statements. Instead, a user can simply configure a simple priority list 152. System 100 can operate using any definable type of data object, which includes arrays of objects as well as single objects. Multiple tiered priority lists 152 can be defined, where a set of control rules can determine which of the priority lists 152 is to apply to a given reconciliation event. Definitions of data sources 110, priority lists 152, and/or control rules can be dynamically adjusted and re-configured, which causes behavior of system 100 to dynamically adjust. In general, system 100 is a highly configurable, efficient, and flexible solution for dealing with reconciliation problems in a manner which is intuitive and simple for users to configure.

To elaborate upon system 100 components, priority array 152 can be any data structure, such as a list, containing an ordered arrangement of data sources each associated with a priority value. The priority array 152 can be utilized to easily present and manage data source priority for configuration items. In one embodiment, array 152 can be an ordered list of data sources for an associated attribute. The first data source in the array can be assigned the highest priority and the last data source assumes the lowest priority. For example, in array 152, data source A can have a priority value of 1 which can be evaluated as a higher priority than data source D with a value of 3. Array 152 can be associated with an attribute of a configuration item. For instance, in entry 146 of reconciliation table 150, CPUType can be associated with priority array A. An attribute with no priority array allows incoming values for that attribute to overwrite pre-existing values for that attribute in a "last-in-wins" behavior. Further, a priority array 152 can be associated with other elements such as classes, subclasses, and arrays of classes. That is, a priority array 152 can be associated with any element in a data set. A unique priority array 152 can be determined for any reconciliation event based upon a known controlling element.

Priority management interface 160 can be utilized to manage array 152. In one embodiment, interface 160 can present a user with four interfaces for managing data source priority, element assignment, and the like. One of the four interfaces can present a common data model (CDM) in a tree structure useful in presenting and configuring the inheritance of configuration items. A second interface can allow priority arrays to be assigned based to the selected elements in the CDM interface. A third interface can list the defined data sources and allow for the manipulation of each data source's priority. A fourth interface can present priority rules which have been defined for the selected elements. The arrangements for interface 160 are for illustrative purposes only and can vary from implementation to implementation.

A data source 110 can be an abstract representation of a definable source for providing data to configuration management database (CMDB) system 120. Any type of input provider can be defined as a data source 110. For example, a Uniform Resource Identifier (URI) identified resource can be defined as a data source 110, a software application can be defined as a data source 110, a sensor can be defined as data source 110, an input peripheral can be defined as a data source 110, a user identifier of a manual input entity can be defined as a data source 110, and the like. Because of the flexibility of a data source 110 definition, it is possible for an update 130 to be considered as being provided from more than one data source 110. In such a situation, precedent rules can be established to indicate which of the possible data sources 110 is to be considered as providing the update 130.

The CMDB system 120 can be any database system or any system that stores a structured collection of data (e.g., data 121) in accordance with a defined data model. In one embodiment, the structured collection of data can be a relational database management system structure. In one embodiment, each data element of the CMDB data 121 can be indexed against a stored data source 110 that provided its value.

Data source engine 126 can uniquely identify each data source in system 120 allowing ownership data to indicate the source of configuration information. Additionally, each incoming and stored configuration item (CI) can be assigned a unique identifier by component 122. This CI identifier can be used by component 122 to identify multiple versions of same configuration item across multiple data sets. For instance, the media access control (MAC) address of a computing device can be used as a unique identifier to identify information about the device from multiple sources 110.

If an identified CI in update 130 is not associated with any prioritization array 152, then priority engine 128 can apply a default priority rule. The default priority rule can be configured to be applied when no specific prioritization array 152 is associated with the class, subclass, or class attribute of a class for the CI. Default prioritization rules are defined for data sources, giving one data source 110 priority over all data from another data source 110. After applying prioritization rules 152 or default priority rules, data source engine 126 can store the CI data and the ownership information.

When reconciliation component 122 determines more than one version of the CI data exists, CI reconciliation can be performed. Each data source in update 130 providing CI information for the attribute can be determined. Engine 128 can search table 150 for a matching priority array 152 based on class, subclass, or attribute identity. If a priority array for the class, subclass, or attribute is found, engine 128 can determine the highest priority data source. This can be performed by priority engine 128 identifying the data source 110 of the CI and locating the data source 110 priority in priority array 152. Priority engine 128 then identifies the priority of the data source 110 that wrote the data already saved in data store 142. The priority of the data source providing the new version of the CI data is compared to the priority of the data source that provided the existing version of the CI data. If the priority of the data source providing the new version of the CI data is higher (assuming a higher priority is associated with a lower value) then the new data is allowed to update/overwrite the existing data. The data that is overwritten can be contained to a single attribute, a subclass, or an entire class level of data, depending on the level at which priority array 152 is defined for that class.

Prioritization levels can be defined and evaluated for each level in the data element handler 124. Levels can include classes, subclasses, class attributes and arrays of classes.

Using prioritization levels, only the elements of the defined priority level are queried. For example, when class level priority is defined, only classes of the CI are queried for defined priority arrays. Handler 124 can provide improved reconciliation efficiency and speed.

Figure 2:
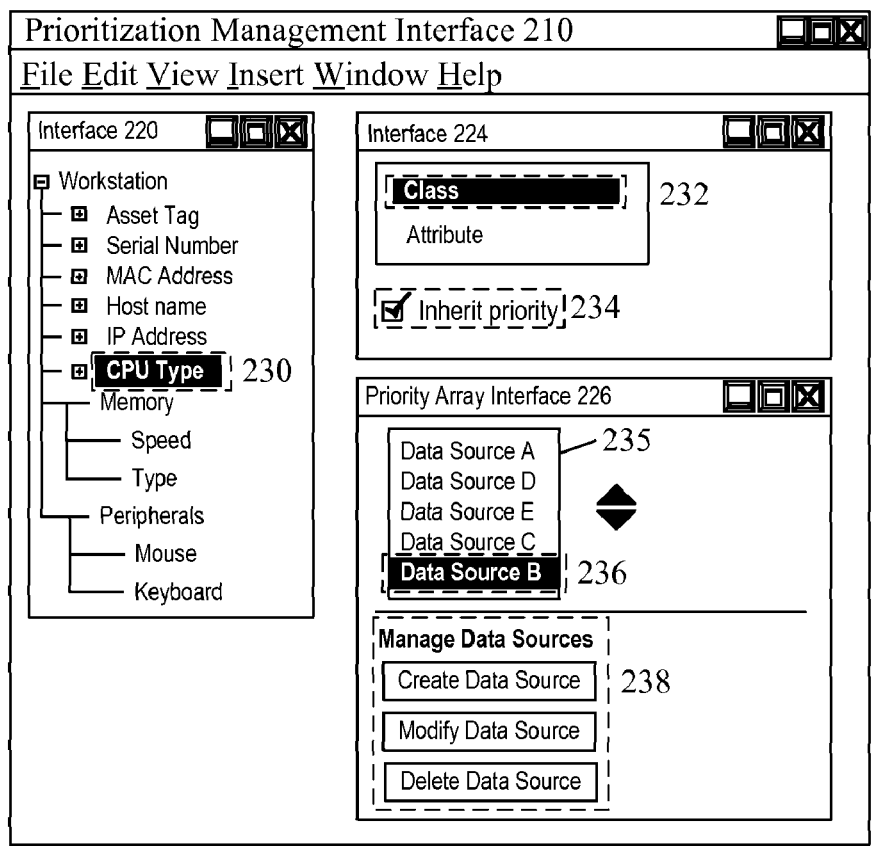
FIG. 2 is a schematic diagram illustrating a graphical user interface for configuring element data source priority in accordance with an embodiment of the inventive arrangements disclosed herein.

FIG. 2 is a schematic diagram illustrating a graphical user interface 200 for configuring element data source priority in accordance with an embodiment of the inventive arrangements disclosed herein. Interface 210 can be presented in the context of system 100. In interface 210, a set of linked interfaces can be utilized to configure data source prioritization for data elements of a data model. The linked interfaces can allow users to quickly and easily identify and modify the priority configuration of data elements. Selection of items in interface 220 can present element configuration options in interface 224, 226. For example, selecting "CPU Type" 230 can present element options 232, 234 in interface 224 and data source priority array 236 in interface 226.

Interface 220 can present a browse-able tree structured view of configuration items (CI) allowing for the selection of constituent elements. Interface 220 enables user selection of controlling elements which can be the target of priority arrays. Multiple items in interface 220 can be selected allowing multiple elements to be assigned priority arrays. Depending on user configuration, multiple CIs can be presented in interface 220 allowing rapid access to a set of CIs.

In interface 224, the level for which a priority array is applied can be configured. Based on the selected element in interface 220, the level can affect objects, classes, subclasses, or attributes. To allow users to quickly configure prioritization, interface 226 can be configured to select the highest level prioritization of the element selected in interface 220. For example, when a class 230 is selected, the class level 232 priority array can be assigned by default. When inheritance of a priority array is permitted, interface 224 can present an inherit priority 234 selection. Selection of the inherit priority 234 option can apply the specified priority array to subordinate nodes in the CI.

Priority array interface 226 can present the priority array for the selected entities in interface 220 and the specified granularity in interface 224. The priority array presented in interface 226 can be assigned to the constituent elements selected in interface 220. In one embodiment, data sources listed in priority array 235 can be easily modified by interactive buttons which can move a selected data source up or down in the list. The data source at the first position in the list acquires the highest priority and the data source at the bottom assumes the least priority. For instance, in array 235, information from Data Source A has a higher priority value associated with it than that of Data Source B. Data source priority can be changed through altering the location of the data source in the array. For example, selected data source 236 priority can be changed by moving it to the top of the list. Alternatively, selected data source can be repositioned by selecting a data source and dragging the selection to the desired position in the list. Multiple data sources can be reprioritized rapidly using either process.

Data sources associated with priority array 235 can be managed through interactive buttons presented in section 238. Data sources can be globally available to all configuration items and array 235 can be auto-populated on demand. Newly created data sources can be automatically added at the lowest priority in the priority array 235. Alternatively, newly created sources can be configured to acquire the highest priority in the priority array. Data source properties can be adjusted to enable data sources to be limited in visibility scope to class, subclasses, and class attributes. Data sources in priority array 235 can be deleted using interactive buttons 238 when de-prioritization is not sufficient.

As used herein, interfaces presented are for illustrative purposes only and should not be construed to limit the invention in any regard. Interface 210 can include a graphical user interface (GUI), a voice user interface (VUI), a multi-modal interface, and a text-based interface. Interfaces 210-226 can represent an optional set of interfaces for configuring system 100. Although, interactive buttons are presented in the discussed embodiments, other interface artifacts are contemplated.

Figure 3:
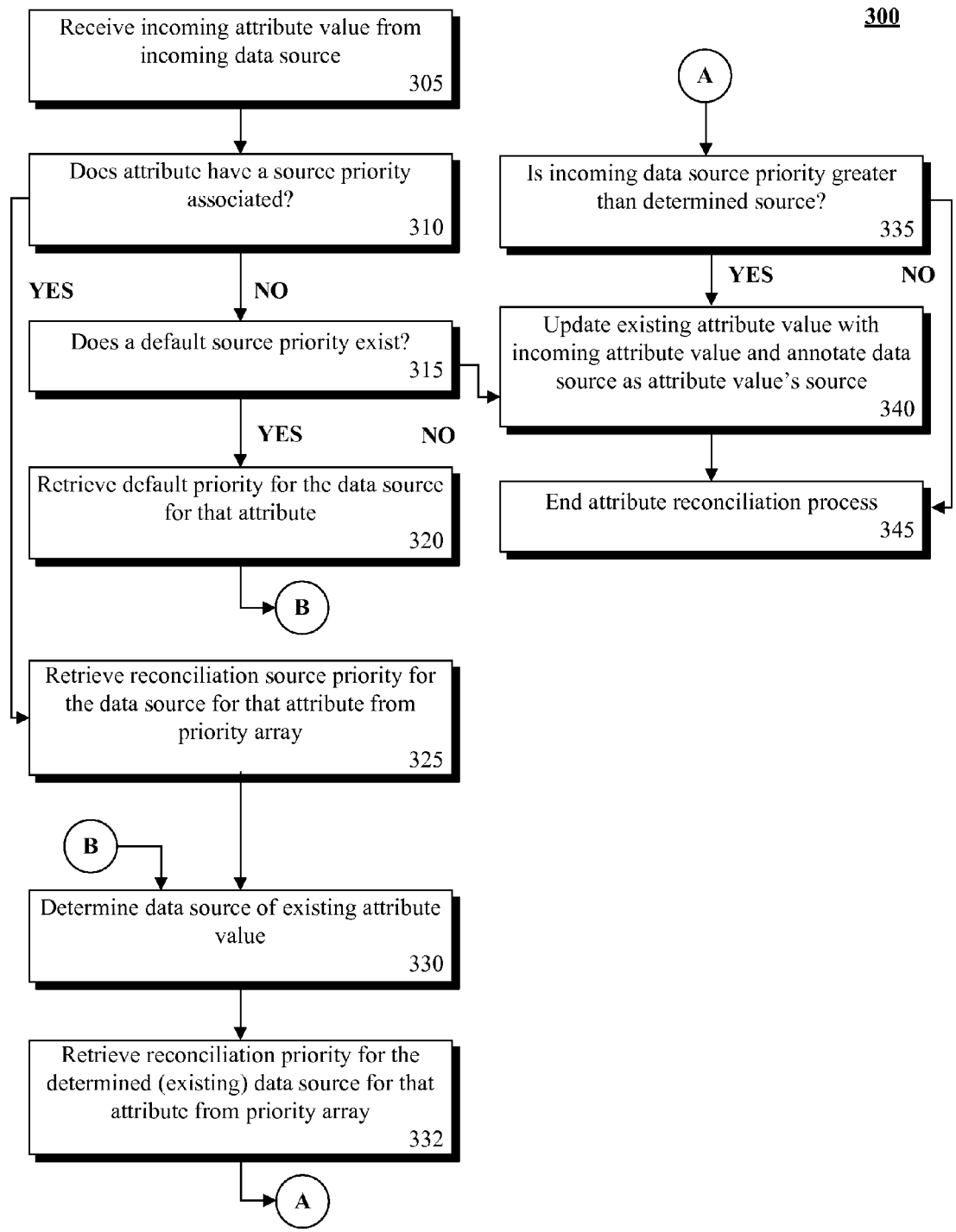
FIG. 3 is a flowchart illustrating a method for data reconciliation utilizing a source prioritization array in accordance with an embodiment of the inventive arrangements disclosed herein.

FIG. 3 is a flowchart illustrating a method 300 for data reconciliation utilizing a source prioritization array in accordance with an embodiment of the inventive arrangements disclosed herein. Method 300 can be performed in the context of system 100. In method 300, data reconciliation can be performed on a received attribute against a stored attribute using stored data source priority information. Attribute reconciliation can be performed by a reconciliation component 122 of a configuration management database (CMDB). As used herein, a CMDB can include but is not limited to a change management database, a federated data store, and the like. Although an attribute is used as a data element in method 300, the invention is not so limited. For example, reconciliation can be based upon a class of data elements or any definable set of structured elements of a data model.

In step 305, a reconciliation component can receive an attribute from an incoming data source. The received attribute can be conveyed by a data source. Data sources can include any application that writes data into a software system where an attribute prioritization code resides. These data writers can include, but are not limited to, a TIVOLI Application Dependency Discovery Manager sensor, a Discovery Library Adapter, a sensor, user input, and the like. In step 310, if the received attribute has a source priority associated with it, the method can proceed to step 325, else proceed to step 315. The source priority can be obtained from a source priority array associated with the received attribute. The array can be an ordered list of data sources in descending order of priority. Source priority can be directly associated with the attribute or can be inherited from a parent node when inheritance behavior is enabled.

In step 315, if a default source priority exists, the method can continue to step 320, else proceed to step 340. In step 320, the default priority for the data source for that attribute can be retrieved. In step 325, the reconciliation source priority for the data source for that attribute can be retrieved from the priority array. In step 330, the stored attribute's data source is determined. In step 332, a reconciliation priority from the determined (existing) data source for that attribute can be retrieved from the priority array. In step 335, if the incoming data source's priority is comparatively greater than the determined source priority, the method can continue to step 340, else proceed to step 345. In step 340, the system can update the existing attribute value with incoming attribute value and annotate the data source as the attributes value's source. In step 345, the attribute reconciliation process can end and unused attribute data can be discarded. The method can repeat for each attribute and/or configuration item being reconciled.

The diagrams in FIG. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for reconciliating data comprising:
   detecting a reconciliation event for a conflicting database item;
   determining for the reconciliation event a controlling element of a database for the reconciliation event, wherein the controlling element comprises a preexisting database value for that element that is different from an update value for that element provided within update data from an update data source;
   configuring an abstract representation that provides a definition for the update data source;
   determining that the update data source is a data source that provided the update data utilizing the configured abstract representation;
   ascertaining that a plurality of abstract representations each associated with a defined data source match criteria for a data source that provided the update data; and
   utilizing a previously configured programmatic rule to determine which of the plurality of abstract definitions takes precedence over other ones of the abstract representations, wherein the update data source is a source associated with the abstract representation that takes precedence over the other ones in accordance with the programmatic rule;
   ascertaining a last data source that provided the preexisting database value;
   retrieving from a data store a priority array associated with the controlling element;
   adjusting the priority array stored in the data store in accordance with received user input;
   determining from the priority array whether the update data source has reconciliation priority over the last data source;
   when the update data source has reconciliation priority, changing a value of the controlling element in the database from the preexisting database value to the update value; and
   when the last data source has reconciliation priority, retaining the preexisting database value for the controlling element in the database.

2. The method of claim 1, further comprising: when changing the value of the controlling element in the database to the update value, recording that the changed value was provided by the update source.

3. The method of claim 2, wherein the recording of the update source occurs within an attribute of the database, and wherein the recorded source for the controlling element is used for determining priority for future reconciliation events involving the controlling element.

4. The method of claim 1, further comprising:
   once the controlling element is determined, comparing the last data source against the update data source; and
   proceeding to retrieve the priority array and selectively changing or retaining the preexisting database value only when the update data source is a data source different from the last data source.

5. The method of claim 1, further comprising:
   receiving the user input from a configuration interface, wherein said configuration interface is a user interface configured to permit a user to define a plurality of data sources and their relative reconciliation priorities to each other for a specified element of the database.

6. The method of claim 1, further comprising:
   determining a plurality of possible database elements that match criteria of the reconciliation event; and
   utilizing a previously configured programmatic rule to determine which of the plurality of possible database elements take precedence over other ones of the possible database elements, wherein the controlling data element is the possible database element that takes precedence over the other ones in accordance with the programmatic rule.

7. The method of claim 1, wherein the controlling element is able to be defined at multiple levels, said levels comprising a class level, a subclass level, and an attribute level.

8. The method of claim 7, further comprising: concurrently applying data elements at different ones of the multiple levels.

9. A computer program product for reconciliating data, the computer program product comprising:
   a non-transitory computer readable medium having computer usable program code embodied therewith, the computer program product being operable to:
   detect a reconciliation event;
   determine for the reconciliation event a controlling element of a database for the reconciliation event, wherein the controlling element comprises a preexisting database value for that element that is different from an update value for that element provided within update data from an update data source;
   configure an abstract representation that provides a definition for the update data source;

determine that the update data source is a data source that provided the update data utilizing the configured abstract representation;

ascertain that a plurality of abstract representations each associated with a defined data source match criteria for a data source that provided the update data;

utilize a previously configured programmatic rule to determine which of the plurality of abstract definitions takes precedence over other ones of the abstract representations, wherein the update data source is a source associated with the abstract representation that takes precedence over the other ones in accordance with the programmatic rule:

ascertain a last data source that provided the preexisting database value;

retrieve from a data store a priority array associated with the controlling element;

determine from the priority array whether the update data source has reconciliation priority over the last data source;

change a value of the controlling element in the database from the preexisting database value to the update value when the update data source has reconciliation priority; and retain the preexisting database value for the controlling element in the database when the last data source has reconciliation priority.

10. The computer program product of claim 9, further comprising:

record that the changed value was provided by the update source when changing the value of the controlling element in the database to the update value.

11. The computer program product of claim 10, wherein the recording of the update source occurs within an attribute of the database, and wherein the recorded source for the controlling element is used for determining priority for future reconciliation events involving the controlling element.

12. A system for reconciliating data comprising:

a data store, comprising hardware for storing data, configured to store a structured collection of configuration management data in accordance with a defined data model, wherein each data element of the structured collection of configuration management data is indexed against a stored data source that provided its value;

a priority array data store, comprising hardware for storing data, configured to store a plurality of user configured priority arrays, each array configured to order a plurality of data sources relative to each other, wherein each priority array is associated with a data element of said defined data model;

a reconciliation event handler, comprising program instructions that are stored and executed on hardware, configured to detect an attempt to change a preexisting value of an attribute included in the structured collection of data with an update value from an update data source, to determine a controlling element for the change, to determine a priority array based upon the controlling element, and to determine whether to selectively update the preexisting value of the attribute with the update value depending upon whether the update data source has a greater reconciliation priority than the data source associated with the preexisting value based upon the determined priority array; and a data source engine, comprising program instructions that are stored and executed on hardware, configured to permit a user to define a plurality of abstract representations of sources able to provide data, wherein said stored data sources and said update data source are each abstract representations defined by the data source engine, wherein said data source engine is configured to permit an authorized user to define an abstract representation for manual user input as a data source, is configured to permit an authorized user to define an abstract representation for a sensor as a data source, is configured to permit an authorized user to define an abstract representation for a software application as a data source, and is permitted to permit an authorized user to define an abstract representation for a Uniform Resource Identifier (URI) identified resource as a data source.

13. The system of claim 12, further comprising: a user interface permitting a user to create and modify said priority arrays and an order of the data sources within the priority arrays.

14. The system of claim 12, further comprising: a data element engine configured to permit an authorized user to designate any level in a class inheritance hierarchy of the defined data model as a data element which associated with one of the priority arrays.

15. The system of claim 12, wherein the controlling element is able to be defined at multiple levels, said levels comprising a class level, a subclass level, and an attribute level, wherein said priority array is utilized regardless of which of the multiple levels the controlling elements are defined at.

* * * * *